Dec. 9, 1930.  G. PARKER  1,784,746
TRUCK
Filed April 25, 1930
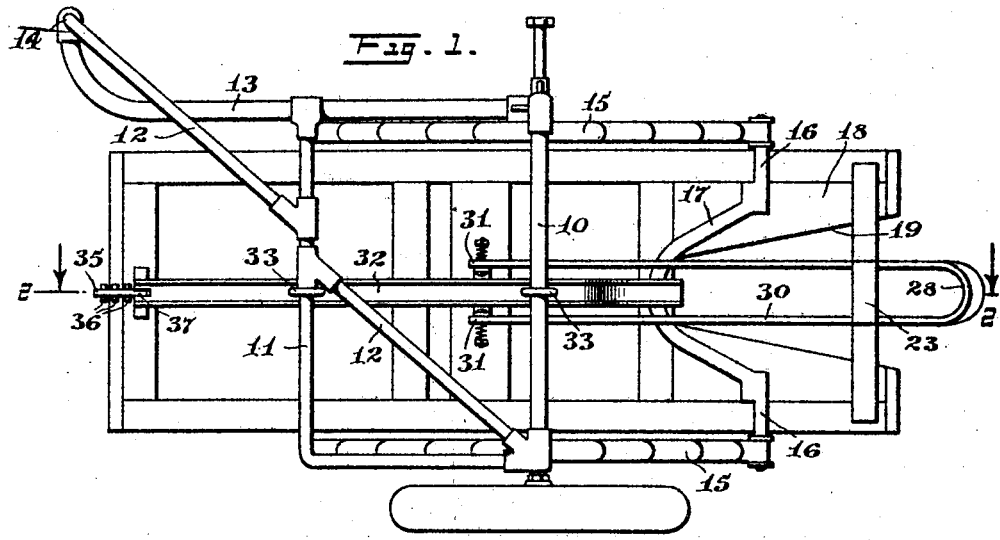
INVENTOR
Grover Parker
BY
Munn & Co.
ATTORNEYS Patented Dec. 9, 1930

1,784,746

UNITED STATES PATENT OFFICE

GROVER PARKER, OF RED BANK, NEW JERSEY

TRUCK

Application filed April 25, 1930. Serial No. 447,333.

This invention relates to trucks.

It is among the objects of the present invention to provide a truck and improved chassis therefor particularly adapted for use as a side car vehicle for motor cycles.

A further object of the present invention is to provide a motor cycle side car truck adapted to receive therein a motor cycle so that the truck may be used as a service vehicle for motor cycle repair work.

A further object of the present invention is to provide a side car truck structure adapted to receive the motor cycle and to support the same with its wheels on the ground for towing connection therewith.

Other important objects of the present invention includes the novel construction and interrelation of parts whereby the whole forms a novel, simple and improved device particularly adapted to meet the demands of economic manufacture.

Other objects of the present invention will be apparent from a consideration of the following specification taken in conjunction with the accompanying drawings, in which Figure 1 is a bottom plan view of one form of the present invention;

Fig. 2 is a longitudinal section taken on the line 2—2 of Fig. 1;

Fig. 3 is a vertical section taken on the line 3—3 of Fig. 1, and

Fig. 4 is a fragmentary perspective view showing the connection of the means for limiting rocking movement of the truck with respect to its chassis.

Referring more particularly to the drawings, it will be seen that the truck is provided with the conventional side car chassis including the transverse axle 10, the parallel cross bar 11, the braces 12, and the side connecting bar 13, the forward end of which connects with the forward cross brace 12 for connection with the motor cycle at the point 14. For supporting the truck body, leaf springs 15 are provided connected at their center point with the axle 10. The forward extremities of the spring are connected by conventional spring shackles (not shown) with the forward portion of the truck body while the rear end of the springs are directly connected to extending ends 16 of a rear end truck supporting bracket 17.

The truck itself includes a box-like truck body having a floor 18, the rear portion of which is centrally cut out as at 19 in Figs. 1 and 2, to provide for the reception therethrough of either the forward or rear wheel of a motor cycle carried by the truck. The body is further provided with sides 20, which are provided for the use of the truck as a tool or machine carrying structure. The rear end of the truck is preferably open while the front end is provided with a hinged front member 21 hingedly associated with the floor by the hinge 22.

For supporting the front wheel of a motor cycle free from the ground so that the rear wheel may be supported on the ground thus to accomplish towing of the motor cycle, a stirrup 23 is provided centrally positioned with respect to the cut-out portion 19 of the truck body. The member forming the stirrup 23 is provided with transversely extending arms 24 which terminate in vertical arms 25, which are apertured as at 26 to receive a securing pin 27 therethrough. The sides 25 extend vertically through the rear edge of the floor 18, as indicated in Fig. 3, the height of the stirrup being adjusted by the passage of the pin 27 through one of the apertures thereof and through a registering aperture of the side 20 of the truck. For assisting in securing a wheel when in the stirrup 23, a pivotally associated horizontal stirrup 28 is provided, which is intermediately pivoted with the stirrup 23 by the resiliently held pivot pin 29. The forward ends of the sides 30 of the stirrup 28 are secured for pivotal connection with the floor 18 by the bracket-and-pin assembly indicated at 31.

For retaining the body of the truck against excessive pivotal movement with respect to the axle 10, means are provided for limiting such rocking movement. The means provided comprises a longitudinally extending centrally connected angle bar 32, which is connected intermediate its ends by U bolts 33, to the axle 10 and to the parallel brace or bar 11. The rear extremity of the bar 32 extends downwardly and is connected with the floor 18 adjacent the forward terminal of the aperture 19 by a spring connection. The forward end of the bar 32 is removably connected to the forward end of the floor 18 by a pivoted latch 35. The latch 35 includes extending pins 36 and is receivable through an aperture 37 in the forward end of the bar 32. The pins 36 are adapted to engage the under surface of the center portion of the bar 32, thus excessive pivotal movement of the body of the truck will be restricted.

In the operation of the device, it will be seen that a motor cycle may be bodily positioned within the truck, its rear wheel being received within the stirrups 23 and 28 and its front wheel resting upon the floor 18. The hinged association of the member 21 is such that the front may be moved outwardly and secured in parallel open position by chains 38. Thus the device is adapted to accommodate motor cycles of varying wheel bases. It will be understood that suitable chains or equivalent securing means may be provided for securing the motor cycle in proper position. The support of its rear wheel within the stirrups 23 and 28 will normally serve to retain it in proper vertical position. When it is desired to tow a motor cycle, the front wheel thereof is positioned within the stirrups 23 and 28. In such instance it is usually preferable to lower the stirrup assembly by removing the pins 27 and dropping down the stirrup 23. The stirrup is locked in its adjusted position by extending the pin 27 through one of the upper apertures of the arms 25. In towing a motor cycle, it is also preferable to lock the body against excessive pivotal movement. Such locking is accomplished by movement of the latch 35 within the aperture 37 of the angle bar 32, as indicated in Fig. 4. Thus the excessive weight of the motor cycle at the rear portion of the truck will not unduly tilt the truck or strain its springs 15.

From the foregoing it will readily be seen that the invention provides a novel, simple and improved service truck for motor cycles, in which a motor cycle may be bodily carried or in which the forward wheel of the motor cycle may be supported, thus to tow the motor cycle. It will be understood that the invention is not confined to specific structural details and that numerous changes, modifications and the full use of equivalents may be resorted to without departing from the spirit or scope of the invention as outlined in the appended claims.

What is claimed is:

1. A service truck for motor cycles or the like, including a truck body, and a wheel receiving stirrup carried thereby, said stirrup being vertically adjustable with respect to said body, the floor of said body being cut away to provide for the extension therethrough of a wheel carried in said stirrup.

2. A service truck for motor cycles or the like, including a recessed truck body and an adjustable stirrup assembly mounted adjacent the recess of said body for securing a motor cycle wheel through the floor of said body.

3. A service truck for motor cycles or the like, including a recessed truck body and an adjustable stirrup assembly mounted adjacent the recess of said body for securing a motor cycle wheel through the floor of said body, said assembly including a vertically extending stirrup.

4. A service truck for motor cycles or the like, including a recessed truck body and an adjustable stirrup assembly mounted adjacent the recess of said body for securing a motor cycle wheel through the floor of said body, and assembly including a vertically extending stirrup and a horizontally extending stirrup.

5. A service truck for motor cycles or the like, including a recessed truck body and an adjustable stirrup assembly mounted adjacent the recess of said body for securing a motor cycle wheel through the floor of said body, said asembly including a vertically extending stirrup and a horizontally extending stirrup, said horizontally extending stirrup being intermediately pivoted.

6. A service truck for motor vehicles or the like, including a recessed truck body and an adjustable stirrup assembly mounted adjacent the recess of said body for securing a motor cycle wheel through the floor of said body, said assembly including a vertically extending stirrup and a horizontally extending stirrup, said horizontally extending stirrup being intermediately pivoted and said vertically extending stirrup being vertically adjustable.

7. A service truck for motor cycles or the like, including a recessed truck body and an adjustable stirrup assembly mounted adjacent the recess of said body for securing a motor cycle wheel through the floor of said body, said assembly including a vertically extending stirrup and a horizontally extending stirrup, said horizontally extending stirrup being intermediately pivoted and said vertically extending stirrup being vertically adjustable, said horizontal stirrup being pivotally associated with the truck body for vertical adjustment and pivotal movement in response to vertical movement of said vertical stirrup.

8. A service truck for motor cycles or the like, including a recessed truck body and an adjustable stirrup assembly mounted adjacent the recess of said body for securing a motor cycle wheel through the floor of said body, said assembly including a vertically extending stirrup and a horizontally extending stirrup, said horizontally extending stirrup being intermediately pivoted and said vertically extending stirrup being vertically adjustable, said horizontal stirrup being pivotally associated with the truck body for vertical adjustment and pivotal movement in response to vertical movement of said vertical stirrup, and means connected to said truck for limiting pivotal movement thereof.

9. A service truck for motor cycles or the like, including a supporting side car chassis, a truck body supported from said chassis by spring means, a wheel supporting member adjustably associated with the rear end of said body, and means for limiting the pivotal movement of said body with respect to said chassis.

10. A service truck for motor cycles or the like, including a supporting side car chassis, a truck body supported from said chassis by spring means, a wheel supporting member adjustably associated with the rear end of said body, and means for limiting the pivotal movement of said body with respect to said chassis, said means including a longitudinally extending angle bar connected at one end with said body through a spring connector.

11. A service truck for motor cycles or the like, including a supporting side car chassis, a truck body supported from said chassis by spring means, a wheel supporting member adjustably associated with the rear end of said body, and means for limiting the pivotal movement of said body with respect to said chassis, said means including a longitudinally extending angle bar connected at one end with said body through a spring connector, the opposite end of said bar being disengageably connected with said body by a pivoted latch.

12. A service truck for motor cycles or the like, including a supporting side car chassis, a truck body supported from said chassis by spring means, a wheel supporting member adjustably associated with the rear end of said body, and means for limiting the pivotal movement of said body with respect to said chassis, said means including a longitudinally extending angle bar connected at one end with said body through a spring connector, the opposite end of said bar being disengageably connected with said body by a pivoted latch, said body including an open rear end adjacent said wheel support and a pivoted closure for the forward end thereof.

GROVER PARKER.